United States Patent [19]

Hacault et al.

[11] Patent Number: 5,007,800
[45] Date of Patent: Apr. 16, 1991

[54] ROTOR BLADE FIXING FOR TURBOMACHINE ROTORS

[75] Inventors: Michel G. P. Hacault, Massy Villaine; Bertrand J. J. M. Heurtel, Vert Saint Denis; Jacques R. Serre, Melun, all of France

[73] Assignee: Societe Nationale D'Etude Et De Construction De Moteurs D'Aviation "S.N.E.C.M.A.", Paris, France

[21] Appl. No.: 417,324

[22] Filed: Oct. 4, 1989

[30] Foreign Application Priority Data

Oct. 5, 1988 [FR] France .................... 88 13004

[51] Int. Cl.$^5$ ............................... F01D 5/30
[52] U.S. Cl. .................... 416/220.00 R; 416/191; 416/217
[58] Field of Search ............ 416/191, 193 A, 204 A, 416/215, 217, 219 R, 220 R, 221; 411/354, 522, 523, 524

[56] References Cited

U.S. PATENT DOCUMENTS

| | | | |
|---|---|---|---|
| 2,654,565 | 10/1953 | Feilden | 416/214 R |
| 2,925,997 | 2/1960 | Hart et al. | 416/220 X |
| 3,063,674 | 11/1962 | Middlebrooks | 416/220 R |
| 3,752,598 | 8/1973 | Bowers et al. | 416/191 X |
| 4,076,455 | 2/1978 | Stargardter | 416/191 |
| 4,687,413 | 8/1987 | Prario | 415/190 |

FOREIGN PATENT DOCUMENTS

| | | | |
|---|---|---|---|
| 619513 | 5/1961 | Canada | 416/193 A |
| 825995 | 10/1969 | Canada | 416/220 R |
| 213055 | 3/1987 | European Pat. Off. | 415/190 |
| 1136390 | 5/1957 | France . | |
| 1227171 | 8/1960 | France . | |
| 289173 | 6/1953 | Switzerland . | |
| 745073 | 2/1956 | United Kingdom . | |
| 2089899 | 6/1982 | United Kingdom . | |

Primary Examiner—John T. Kwon
Assistant Examiner—James A. Larson
Attorney, Agent, or Firm—Oblon, Spivak, McClelland, Maier & Neustadt

[57] ABSTRACT

The rotor of a turbomachine has a rotor blade stage formed by sectors which are each secured to a rotor drum by radially inwardly directed, axially spaced flanges on the blade platform of the sector cooperating with radially outwardly directed, axially spaced flanges on the drum. The cooperating downstream flanges of the drum and the blade platform have at least one pair of registering holes through which a cylindrical pin extends, the pin having a radial collar interposed between the two flanges and an annular groove positioned downstream from the collar. The assembly is held in position by scalloped segments which are inserted into an annular groove in the drum on the downstream side of the downstream flange, and which are shifted circumferentially to engage edges thereof in the grooves of the pins before being locked by tongues at opposite ends of the segments.

4 Claims, 4 Drawing Sheets

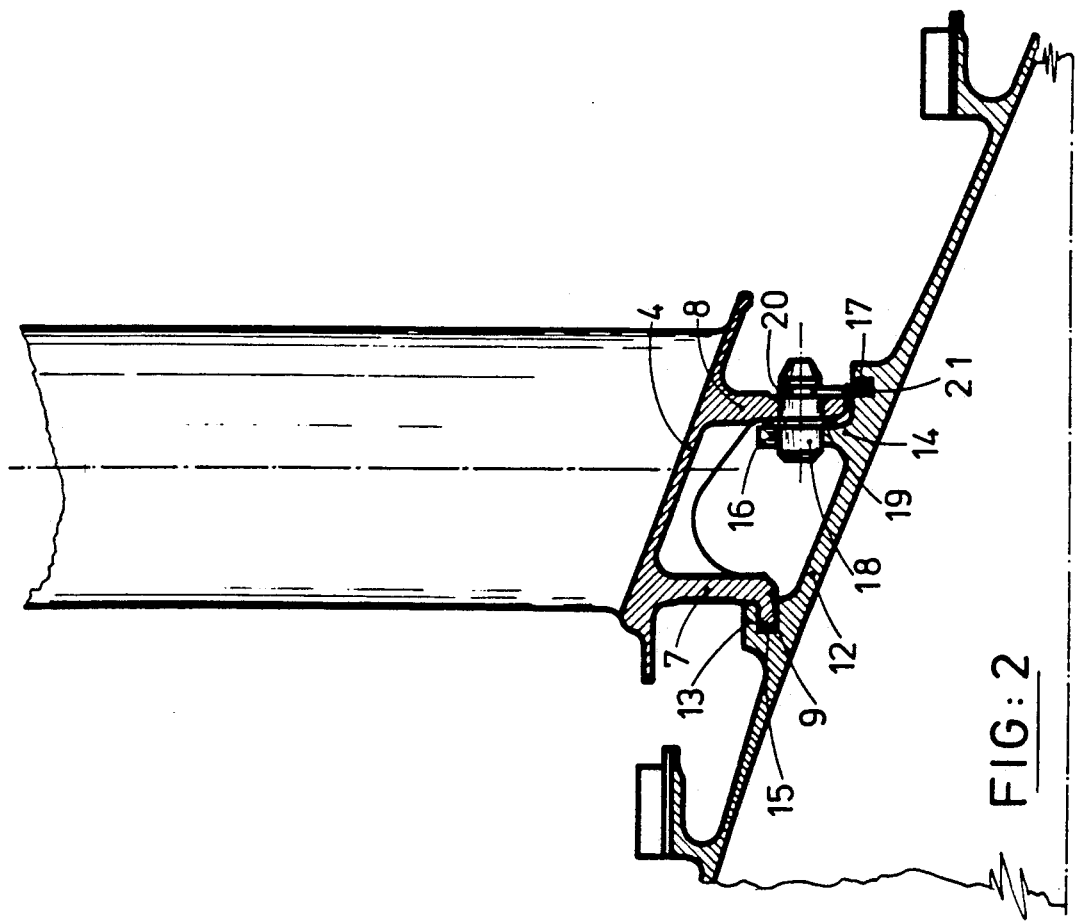
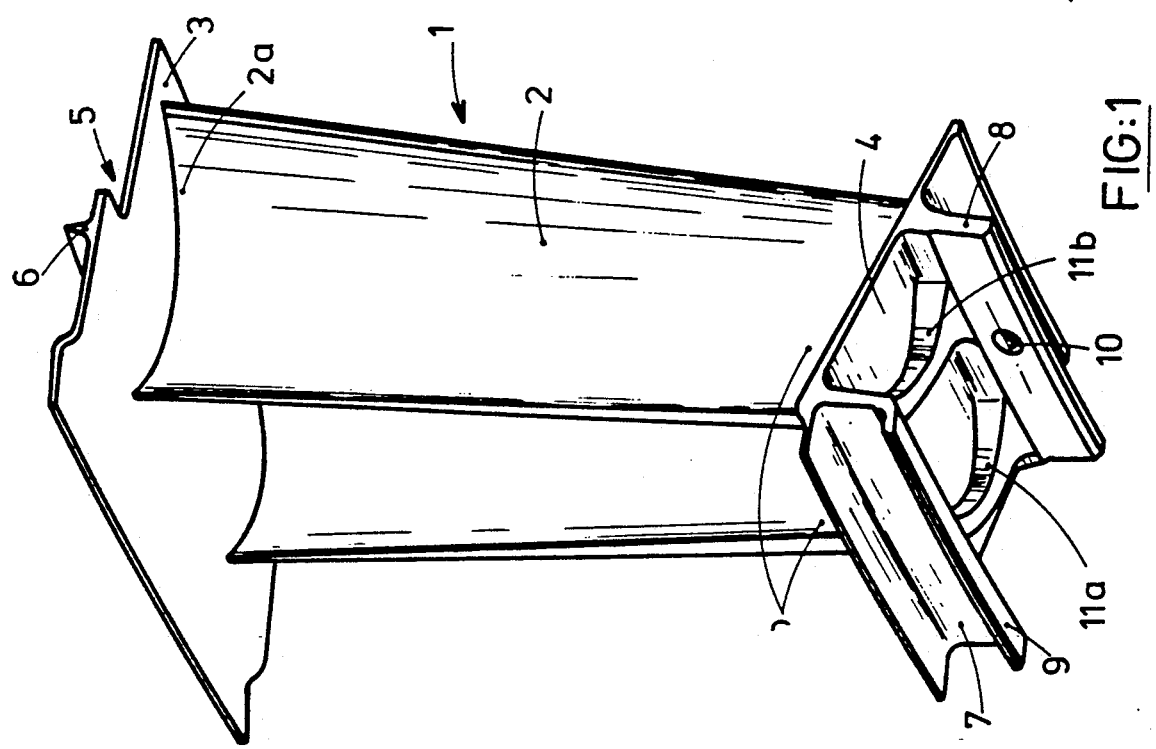

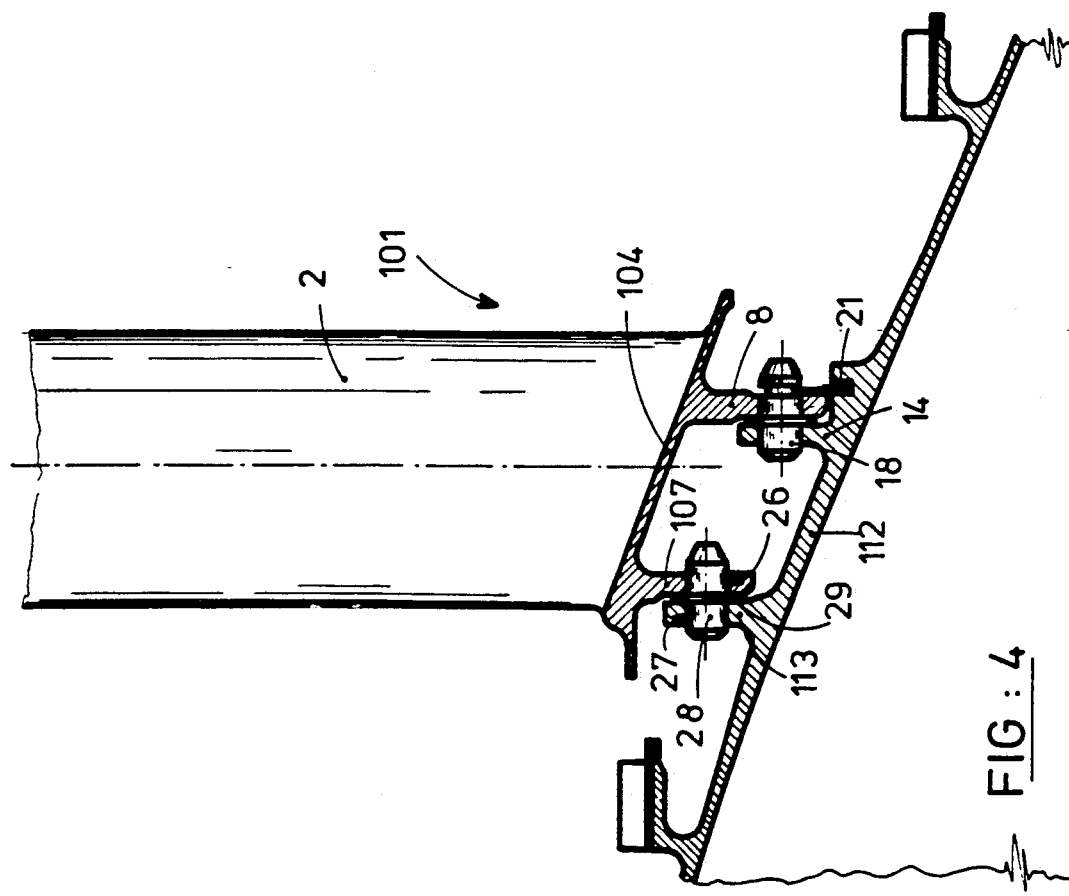
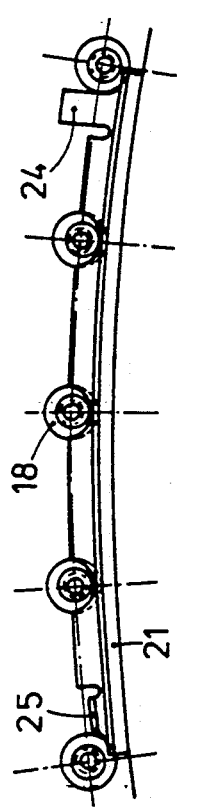
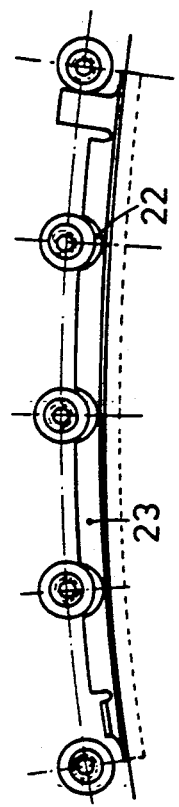
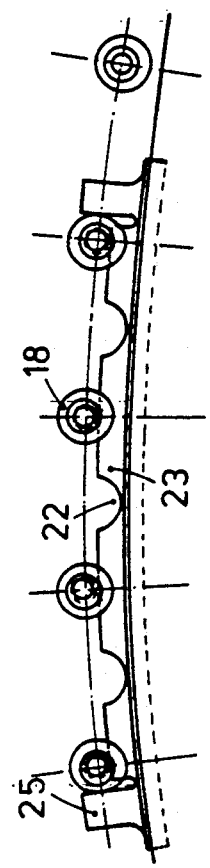

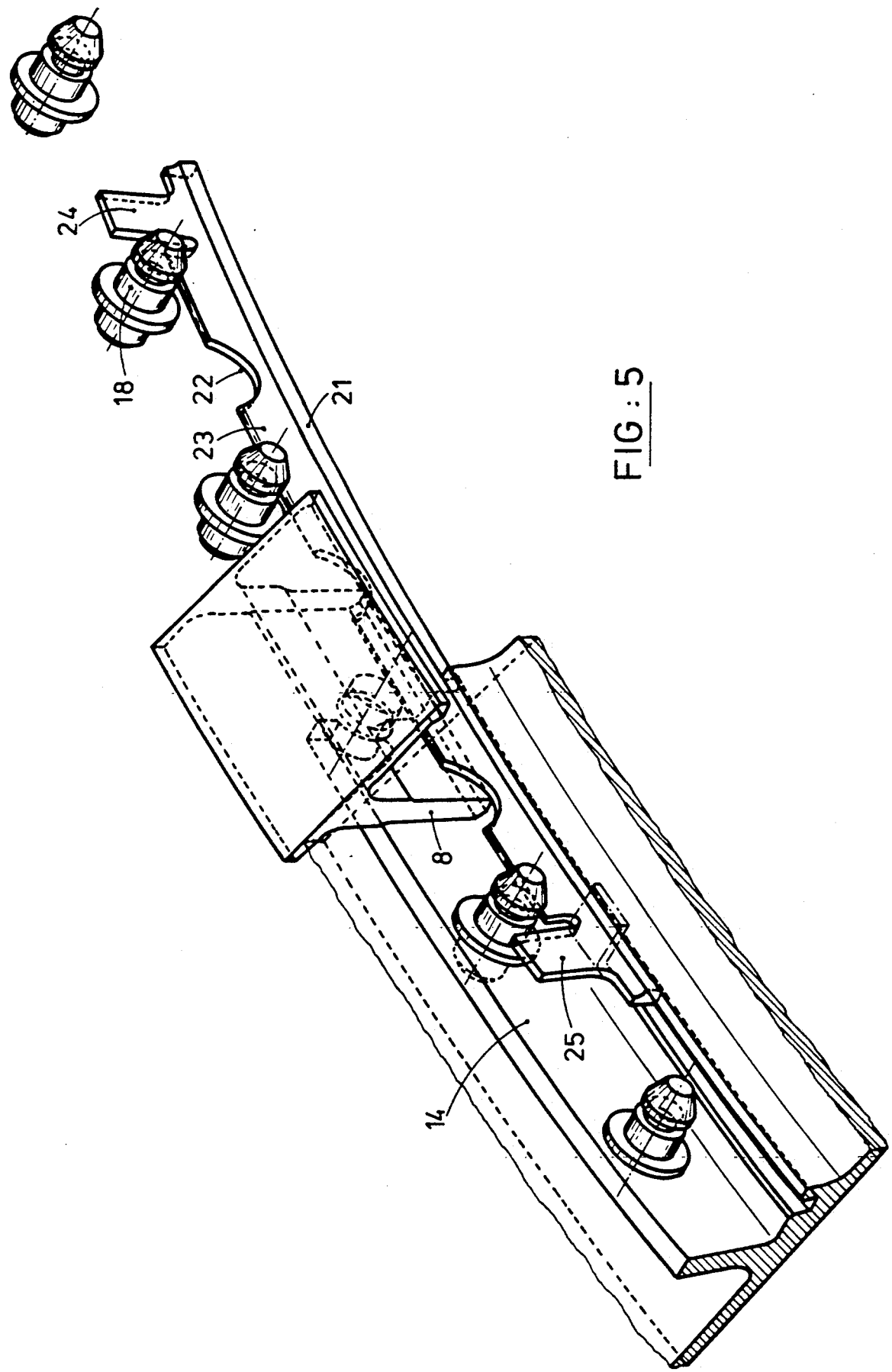
FIG: 5

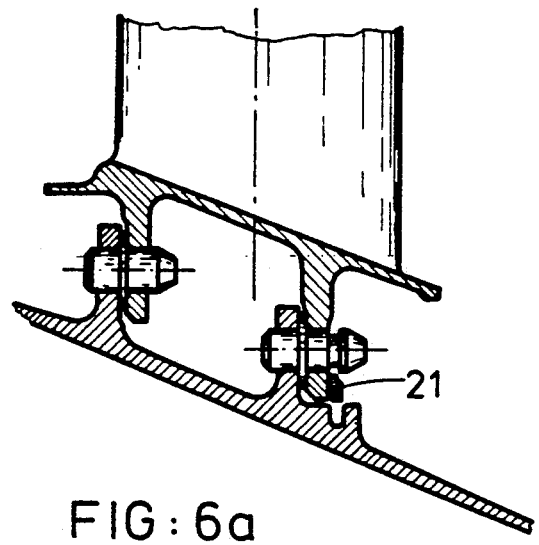
FIG: 6a
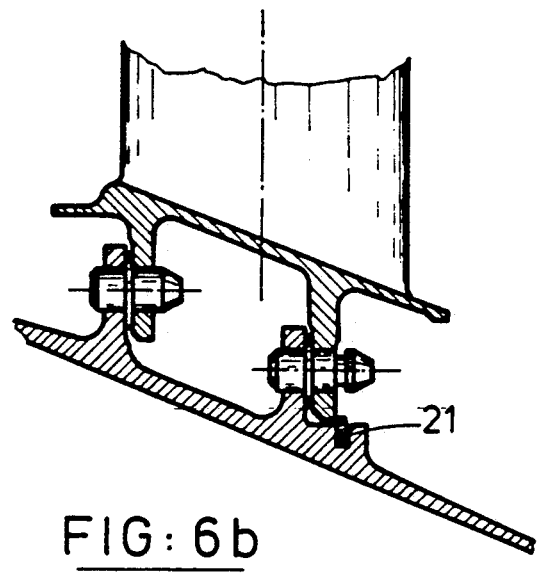
FIG: 6b
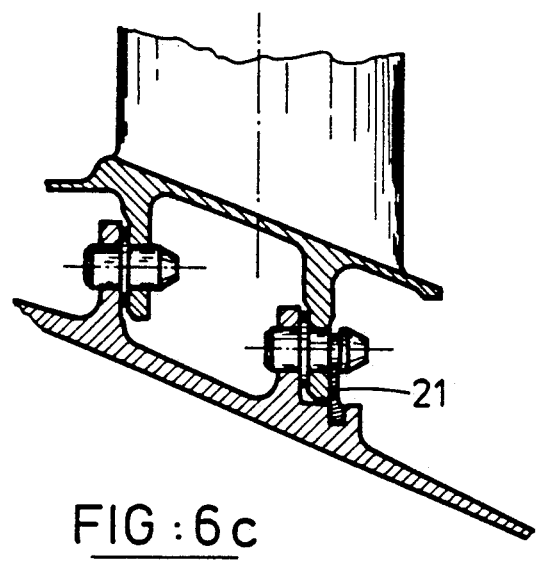
FIG: 6c

ROTOR BLADE FIXING FOR TURBOMACHINE ROTORS

BACKGROUND OF THE INVENTION

1. Field of the invention

The present invention relates to the rotor of a turbomachine, and in particular to the means by which the blades are fixed on the rotor.

2. Summary of the prior art

Several methods are currently used to effect the fixing and radial retention of the movable blades mounted on the high speed rotor discs or drums of modern turbomachines. It is usual for the blades to be constituted by a vane Proper having an aerodynamic shape which ensures the required performance for a compression or turbine stage, and a base comprising a root above which there may be a platform defining the inner wall of the main flow path of the gases. This root, which may be, for example, hammer or fir-tree shaped, is fitted in a cooperating axial groove provided on the rim of a rotor disc or on the outer periphery of a rotor drum. In some cases, the fixing may instead be in a peripheral or circumferential direction. In all cases complementary means usually ensure locking of the blades in the different radial, axial and peripheral directions.

These early solutions, which are well known and still widely used, particularly in aeronautical applications both in the military and civil fields, are not, however, fully satisfactory when applied to aircraft engines of the new type, particularly those in which the gas generator is associated with an additional power turbine of low rotational speed intended to drive either a fan or a propeller, and comprising in particular two contra-rotating stages. As a result of the reduction in rotational speed, and therefore also of the stress level to which the rotating parts are subjected, a lighter system than the previously used techniques can be used. This aim for lightness is accompanied by a search for simplification, particularly so as to make assembly easier. Finally, taking into account the new conditions of operation, good stability of the low speed parts of the rotor must be obtained.

Certain elements of the present solution which, however, in themselves are inadequate, may be found in earlier arrangements which have not reached the degree of complexity and sophistication of some more recent, better known solutions. For example, U.S. Pat. No. 2,654,565 describes the mounting of blades of which the base has shoulders constituting hooks cooperating with slits formed in the rims of discs assembled to form a rotor, and U.S. Pat. No. 3,063,674 discloses the use of rivets for fixing the rotor blades.

SUMMARY OF THE INVENTION

According to the invention, there is provided a turbomachine rotor having:

a rotor drum, said drum being provided with at least two radially outwardly directed flanges spaced axially apart from each other and defining an upstream drum flange and a downstream drum flange with respect to the direction of flow of gases through said turbomachine rotor, a circular row of evenly spaced holes through said downstream drum flange, and an annular groove adjacent the base of said downstream drum flange on the downstream side thereof;

a stage of rotor blades mounted circumferentially on said rotor drum, said stage including a plurality of blade platforms, each of said platforms carrying at least two racially inwardly directed flanges spaced axially apart from each other and defining an upstream platform flange and a downstream platform flange cooperating respectively with said upstream and downstream flanges of said drum, said downstream platform flange having at least one hole registering with at least one of said holes in said downstream drum flange;

a generally cylindrical pin projecting through each pair of registering holes of said downstream drum and platform flanges, each of said pins having a substantially central radial collar interposed between said downstream drum flange and said downstream platform flange, and an annular groove disposed downstream of said collar; and a plurality of scalloped segments disposed in said drum groove, each of said segments having its radially outer edge defining teeth separated by a plurality of cut-outs, each of said teeth being received in said annular groove of one of said pins to hold said pins and said rotor blades in position radially, axially and tangentially, and each of said segments carrying a tongue at each end thereof, one of said tongues extending radially and the other of said tongues being bent at right angles to permit movement of said segment to engage said teeth in said grooves of said pins, said other tongue thereafter being radially straightened to lock said segments, said pins and said rotor blades in position.

The invention also incorporates several advantageous embodiments, particularly in the case where the stage of rotor blades is constituted by a plurality of sectors, each of said sectors comprising one of said blade platforms, and two circumferentially spaced, radially directed blade vanes having their inner ends joined to said platform. For example, said upstream flange of each of said blade platforms is provided with a hook portion projecting in the upstream direction, and said cooperating upstream drum flange has an annular recess on its downstream side which receives said hook portion.

Alternatively, depending on the application envisaged, the upstream drum flange may have a circular row of evenly spaced holes therethrough, and the cooperating upstream flange of each blade platform has at least one hole registering with at least one of said holes in said upstream drum flange, said rotor including a generally cylindrical pin projecting through each pair of registering holes of said upstream drum and platform flanges, each of said pins having a substantially central radial collar interposed between said upstream drum flange and said upstream platform flange.

Other features and advantages of the invention will become apparent from the following description of the preferred embodiments with reference to the attached drawings.

BRIEF DESCRIPTION OF THE DRAWINGS

FIG. 1 shows a diagrammatic perspective view of a sector of a blade stage of a turbomachine rotor in accordance with a first embodiment of the invention;

FIG. 2 shows a diagrammatic partial longitudinal section through the sector of FIG. 1 secured on the rotor drum, the section being taken in a plane passing through the axis of the rotor.

FIGS. 3a, 3b and 3c are diagrammatic scrap views showing three stages in the fitting of the locking segments for securing the blade stage sectors on the rotor drum as shown in FIG. 2.

FIG. 4 is a view similar to that of FIG. 2, but showing the attachment of a sector to the rotor drum of a second embodiment of a turbomachine rotor in accordance with the invention.

FIG. 5 is a partially cut-away perspective view, on an enlarged scale, showing a sector locking segment and its mounting on the rotor drum shown in FIG. 4.

FIGS. 6a, 6b and 6c are partial sectional views similar to FIG. 4 showing three stages in the fitting of the locking segments on the rotor drum of the second embodiment, corresponding to the stages shown in FIGS. 3a, 3b and 3c for the first embodiment.

DESCRIPTION OF THE PREFERRED EMBODIMENTS

In the first embodiment of a turbomachine rotor in accordance with the invention shown in the drawings, the illustrated stage of movable blades secured on the rotor drum is composed of sectors 1 each with two blades, one such sector being shown in FIG. 1. Each section 1 thus comprises two blade vanes 2, the radially outer ends 2a of which are joined by a common head 3 and the radially inner ends 2b of which are carried by a common platform 4.

The peripheral edges of the head 3 are cut in a Z-shape as shown at 5, to enable the heads of adjacent sectors to cooperate to form a radially outer crown at the tips of the movable rotor blades. The head 3 also carries, on its outer face, a radially projecting peripheral ridge 6 which has a tooth-shaped section and which provides a seal at the periphery of the movable blading by cooperating with the corresponding inner surface, which may be fitted with a packing of abradable type, of the casing surrounding said blading, this method of construction being well known per se. In the example shown a single ridge 6 is used, but there could be several.

In accordance with the invention, the platform 4 has, on its radially inner face, upstream and downstream radial flanges 7 and 8 extending in a peripheral direction. The upstream flange 7 has its free edge turned forwards to form a hook 9, and the downstream flange 8 has a hole 10 at the centre thereof. In the example shown, the radially inner face of the platform 4 is reinforced by ribs 11a, 11b extending between the bases of the flanges 7 and 8.

In this first embodiment of the invention, the part of the rotor drum 12 on which the sectors 1 which have just been described with reference to FIG. 1 are mounted to form a movable blade stage is shown diagrammatically in FIG. 2. In this example, several such stages may be provided to form the rotor of a power turbine associated with a gas generator to drive a propeller, not shown in the drawings.

The outer surface of the drum 12 has, in the region of the said blading, two perhiperhally extending, axially spaced, upstream and downstream radial flanges 13 and 14 respectively. The upstream flange 13 has an annular recess 15 opening on its downstream side and shaped to receive the hook 9 of a sector 1. The downstream flange 14 has a row of evenly spaced holes 16 and, at its base on the downstream side, an annular outwardly facing groove 17.

The mounting and securing of the blade sectors 1 on the rotor drum 12 is carried out as follows. A generally cylindrical pin 18 having a radial collar 19 near its middle and an annular groove 20 spaced from the collar on the downstream side thereof is introduced into each of the holes 16 in the downstream flange 14 of the drum 12 from the downstream side until the collar 19 bears against the downstream face of the flange 14. Each sector 1 is then fitted by engaging the hole 10 of the downstream flange 8 of the blade platform 4 on one of the pins 18, and then pushing the sector 1 in an upstream direction over the pin 18 so as to engage the hook 9 of the upstream flange 7 of the blade platform 4 into the recess 15 of the upstream flange 13 on the rotor drum 12.

For locking the assembly use is made of scalloped locking segments 21 which are fitted as shown in FIGS. 3a, 3b and 3c. Each scalloped segment 21 has, on its radially outer edge, a number of arcuate recesses 22 separated by teeth 23, and a tongue at each end, one tongue 24 being straight and the other tongue 25 being bent at right angles. The scalloped segment 21 is introduced beneath the pins 18 so that it bears against the downstream face of the downstream flange 8 of the blade platform 4, and the recesses 22 face the pins 18 as shown in FIG. 3a. The segment 21 is then lowered radially into the groove 17 of the rotor drum 12 as shown in FIG. 3b. Finally, the segment 21 is shifted in a circumferential direction until the teeth 23 locate in the grooves 20 of the pins 18, and the tongue 25 is straightened, thus obtaining a radial and circumferential locking of the segments 21 and an axial locking of the blade sectors 1. This last stage of the fitting is shown in FIG. 3c, and corresponds to the final assembly shown in FIG. 2. The pins 18 also ensure the prevention of counter-rotation of the blade sectors 1. Another advantage of the arrangement just described lies in the stability afforded by the substantial relative length of the peripheral guiding of the blade sector 1 obtained by the hook 9 of the upstream flange 7 of the blade platform 4.

The invention is, of course, also capable of other embodiments, which may be preferred depending on the particular conditions of the applications concerned, and one example of a second embodiment is shown in FIGS. 4 to 6. In this second embodiment, the means for securing each blade sector 101 on the rotor drum 112 at its downstream side is identical to that in the first embodiment described above with reference to FIGS. 1 to 3, and the same references have been retained to denote the downstream flanges 8 and 14 of the blade platform 104 and the rotor drum 112 respectively, the pins 18 and the scalloped locking segments 21. On the other hand, references increased by one hundred have been used to denote elements in the second embodiment which are different, these differences relating mainly to the seucring means used on the upstream side.

The blade platform 104 has, as before, an upstream radial flange 107, but in this second embodiment the flange 107 has a hole 26 at the centre in a manner similar to the downstream flange 8. Similarly, the rotor drum 112 has an upstream flange 113 which, in the same way as the downstream drum flange 14, has a row of evenly spaced holes 27. The corresponding cooperating holes 26 and 27 are penetrated by a generally cylindrical pin 28 which, similarly to the downstream pins 18, has a substantially central radial collar, which seats between the two cooperating upstream flanges 107 and 113. In contrast, however, the pin 28 has no downstream groove 20.

The manner of assembling the movable blading stage of the rotor of this second embodiment is similar to that of the blading of the first embodiment described with reference to FIGS. 1 to 3, and particularly the assembly stages of FIGS. 3a, 3b and 3c. The pins 18 are fitted as before, and the pins 28 are inserted in a similar manner into the holes 27 of the upstream flange 113 of the rotor drum 112 from the downstream side until the pin collar 29 bears against the downstream face of the flange 113. Each blade sector 101 is then fitted by inserting the upstream flange 107 of the blade platform 104 between the drum flanges 113 and 14, and then pushing the sector upstream so that the pins 28 and 18 enter the holes 26 and 10 respectively of the upstream 107 and downstream 8 flanges of the blade platform 104. The scalloped locking segments 21 are then fitted in an identical manner to that which was described for the first embodiment.

Details of the pins 18, a scalloped segment 21, the downstream flange 8 of the blade platform, and the downstream flange 14 of the drum are shown on an enlarged scale in FIG. 5, and FIGS. 6a, 6b and 6c show different stages in the fitting of the scalloped segments 21 in the second embodiment of the invention, each figure showing a sectional view corresponding to the stages shown in the previous FIGS. 3a, 3b and 3c respectively.

As will be appreciated, although the invention has been described in these embodiments in connection with sectors comprising two blades, it is of course applicable to all rotor blade securing applications, whether the blades are secured individually, each sector having a platform associated with a single blade vane, or whether the sectors each have more than two blades.

We claim:

1. A turbomachine rotor having:
   a rotor drum, said drum being provided with
      at least two radially outwardly directed flanges spaced axially apart from each other and defining an upstream drum flange and a downstream drum flange with respect to the direction of flow of gases through said turbomachine rotor,
      a circular row of evenly spaced holes through said downstream drum flange, and
      an annular groove adjacent the base of said downstream drum flange on the downstream side thereof;
   a stage of rotor blades mounted circumferentially on said rotor drum, said stage including a plurality of blade platforms, each of said platforms carrying
      at least two radially inwardly directed flanges spaced axially apart from each other and defining an upstream platform flange and a downstream platform flange cooperating respectively with said upstream and downstream flanges of said drum,
      said downstream platform flange having at least one hole registering with at least one of said holes in said downstream drum flange;
   a generally cylindrical pin projecting through each pair of registering holes of said downstream drum and platform flanges, each of said pins having
      a substantially central radial collar interposed between said downstream drum flange and said downstream platform flange, and
      an annular groove disposed downstream of said collar; and
   a plurality of scalloped segments disposed in said annular groove of said drum,
      each of said segments having its radially outer edge defining teeth separated by a plurality of cutouts, each of said teeth being received in said annular groove of one of said pins to hold said pins and said rotor blades in position radially, axially and tangentially,
      and each of said segments carrying a tongue at each end thereof, one of said tongues extending radially and the other of said tongues being bent at right angles to permit movement of said segment to engage said teeth in said grooves of said pins, said other tongue thereafter being radially straightened to lock said segments, said pins and said rotor blades in position.

2. A turbomachine rotor according to claim 1, wherein said stage of rotor blades is constituted by a plurality of sectors, each of said sectors comprising one of said blade platforms, two circumferentially spaced, radially directed blade vanes having their inner ends joined to said platform, and a common head plate joining the outer ends of said blade vanes, said head plate having opposite peripheral edges cut in a Z-shape to cooperate with the head plates of adjacent sectors, and said head plate carrying at least one sealing ridge on its outer surface.

3. A turbomachine rotor according to claim 1, wherein said upstream flange of each of said blade platforms is provided with a hook portion projecting in the upstream direction, and said cooperating upstream drum flange has an annular recess on its downstream side which receives said hook portion.

4. A turbomachine rotor according to claim 1, wherein said upstream drum flange has a circular row of evenly spaced holes therethrough, and the cooperating upstream flange of each blade platform has at least one hole registering with at least one of said holes in said upstream drum flange, said rotor including a generally cylindrical pin projecting through each pair of registering holes of said upstream drum and platform flanges, each of said pins having a substantially central radial collar interposed between said upstream drum flange and said upstream platform flange.

* * * * *

UNITED STATES PATENT AND TRADEMARK OFFICE
CERTIFICATE OF CORRECTION

PATENT NO. : 5,007,800
DATED : APRIL 16, 1991
INVENTOR(S) : HACAULT ET AL

It is certified that error appears in the above-identified patent and that said Letters Patent is hereby corrected as shown below:

Column 3, line 56, change "perhiperhally" to --peripherally--.

Column 4, line 50, change "seucring" to --securing--.

Signed and Sealed this

Fifth Day of January, 1993

Attest:

DOUGLAS B. COMER

*Attesting Officer*   Acting Commissioner of Patents and Trademarks